United States Patent
Yu et al.

(10) Patent No.: US 8,233,057 B2
(45) Date of Patent: Jul. 31, 2012

(54) APPARATUS AND METHOD FOR IMAGE CAPTURING

(75) Inventors: Chih-Shih Yu, Hsinchu (TW); Chih-Ying Tu, Fongshan (TW)

(73) Assignee: Alpha Imaging Technology Corp., Jhubei, Hsinchu County (TW)

( * ) Notice: Subject to any disclaimer, the term of this patent is extended or adjusted under 35 U.S.C. 154(b) by 362 days.

(21) Appl. No.: 12/761,703

(22) Filed: Apr. 16, 2010

(65) Prior Publication Data
US 2010/0201844 A1  Aug. 12, 2010

Related U.S. Application Data

(63) Continuation-in-part of application No. 11/741,785, filed on Apr. 30, 2007, now abandoned.

(30) Foreign Application Priority Data

May 12, 2006  (TW) .............................. 95117009 A

(51) Int. Cl.
*H04N 5/228* (2006.01)
*G06K 9/00* (2006.01)
(52) U.S. Cl. .................... 348/222.1; 382/251
(58) Field of Classification Search .................. 382/251
See application file for complete search history.

(56) References Cited

U.S. PATENT DOCUMENTS

| | | | |
|---|---|---|---|
| 6,330,369 B1 * | 12/2001 | Cornog et al. | 382/251 |
| 7,805,014 B2 * | 9/2010 | Choi | 382/251 |
| 2003/0035589 A1 * | 2/2003 | Kim | 382/239 |
| 2006/0050971 A1 * | 3/2006 | Page et al. | 382/232 |
| 2006/0192860 A1 | 8/2006 | Atsumi et al. | |
| 2007/0047646 A1 * | 3/2007 | Koh et al. | 375/240.03 |
| 2009/0274365 A1 * | 11/2009 | Tsuda et al. | 382/166 |

* cited by examiner

*Primary Examiner* — Albert Cutler
(74) *Attorney, Agent, or Firm* — Thomas|Kayden

(57) ABSTRACT

An image capturing method including following steps is provided. A preview image is captured and compressed into a compressed preview image according to a preview quantization table. An image complexity is judged by determining the amount of high frequency components the preview image has according to a set of factors consisting of the preview quantization table, a resolution of the preview image and a size of the compressed preview image. The more the amount of high frequency components the preview image has, the higher the image complexity. A to-be-captured image is captured. An initial quantization table is determined according to a set of factors consisting of the image complexity, a resolution of the to-be-captured image and an image compression target. The to-be-captured image is compressed into an output image according to the initial quantization table.

9 Claims, 9 Drawing Sheets

APPARATUS AND METHOD FOR IMAGE CAPTURING

This application is a continuation-in-part application of application Ser. No. 11/741,785, filed Apr. 30, 2007, and claims the benefit of Taiwan application Serial No. 95117009, filed May 12, 2006, the subject matter of which is incorporated herein by reference.

BACKGROUND OF THE INVENTION

1. Field of the Invention

The invention relates in general to an image capturing apparatus and a method thereof, and more particularly to an image capturing apparatus for compressing a preview image in a preview mode to judge an image complexity and calculate a preview compressed setting value in advance, and an image capturing method.

2. Description of the Related Art

FIG. 1 is a schematic illustration showing a first conventional image capturing apparatus 10 in a capturing mode. Referring to FIG. 1, the conventional image capturing apparatus 10 includes an image sensing unit 110, an image processing unit 120, an image storing unit 130, an image compressing unit 140 and a control unit 150. When the conventional image capturing apparatus 10 enters a capturing mode, the image sensing unit 110 captures a to-be-captured image S1 and outputs a to-be-captured image signal S2 according to the to-be-captured image S1. The image processing unit 120 processes the to-be-captured image signal S2 to output to-be-captured image data S3, which is stored in the image storing unit 130 in the capturing mode. The control unit 150 controls the image compressing unit 140 to compress the to-be-captured image data S3 to make the image compressing unit 140 output a compressed image S4. The control unit 150 outputs a compressed setting value S5 according to the compressed image S4 and judges whether the compressed image S4 reaches a predetermined target or not. If not, the image compressing unit 140 compresses the to-be-captured image data S3 again according to the compressed setting value S5 until the compressed image S4 reaches the predetermined target.

FIG. 2 is a schematic illustration showing a second conventional image capturing apparatus in the capturing mode. As shown in FIG. 2, the image storing unit 130 may also store the to-be-captured image signal S2 outputted from the image sensing unit 110. The image processing unit 120 processes the to-be-captured image signal S2 in the image storing unit 130 to output the to-be-captured image data S3. Then, the control unit 150 controls the image compressing unit 140 to compress the to-be-captured image data S3 into the predetermined target.

However, the conventional image capturing apparatus cannot compress the to-be-captured image data until it enters the capturing mode. Thus, the conventional image capturing apparatus needs a longer period of time to compress the to-be-captured image data into the predetermined target.

SUMMARY OF THE INVENTION

It is therefore an object of the invention to provide an image capturing apparatus and an image capturing method thereof. When the image capturing apparatus is still in a preview mode, the apparatus compresses a preview image in advance and judges an image complexity according to at least one of a set of factors consisting of a compressed setting, a resolution of the preview image and a size of the compressed preview image. Thus, after entering a capturing mode, the image capturing apparatus determines an initial compressed setting value, which is a new compressed initial value, according to at least one of a set of factors consisting of the image complexity obtained in a previous step, a resolution of a to-be-captured image and a compressed image target size, and rapidly compresses captured image data to compressed data approaching the predetermined target size or speeds up the converging speed of the image compressing loop according to the initial compressed setting value.

The invention achieves the above-identified object by providing an image capturing method. The image capturing method includes the following steps. A preview image is captured and compressed into a compressed preview image according to a preview quantization table. An image complexity is judged by determining the amount of high frequency components the preview image has according to a set of factors consisting of the preview quantization table, a resolution of the preview image and a size of the compressed preview image. The more the amount of high frequency components the preview image has, the higher the image complexity. A to-be-captured image is captured. An initial quantization table is determined according to a set of factors consisting of the image complexity, a resolution of the to-be-captured image and an image compression target. The to-be-captured image is compressed into an output image according to the initial quantization table.

The invention also achieves the above-identified object by providing an image capturing apparatus including an image sensing unit, an image processing unit, an image compressing unit and a control unit. The image sensing unit captures a preview image and a to-be-captured image, and outputs a preview image signal and a to-be-captured image signal. The image processing unit processes the preview image signal and the to-be-captured image signal and outputs preview image data and to-be-captured image data. The image compressing unit compresses the preview image data and the to-be-captured image data.

The control unit controls an image compressing operation of the image compressing unit. The control unit controls the image compressing unit to compress the preview image data according to a preview quantization table and output a compressed preview image, and judges an image complexity by determining the amount of high frequency components the preview image has according to a set of factors consisting of the preview quantization table, the resolution of the preview image and the size of the compressed preview image. The more the amount of high frequency components the preview image has, the higher the image complexity. The control unit determines an initial quantization table according to a set of factors consisting of the image complexity, the resolution of the to-be-captured image and an image compression target. The control unit controls the image compressing unit to compress the to-be-captured image data into an output image according to the initial quantization table.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
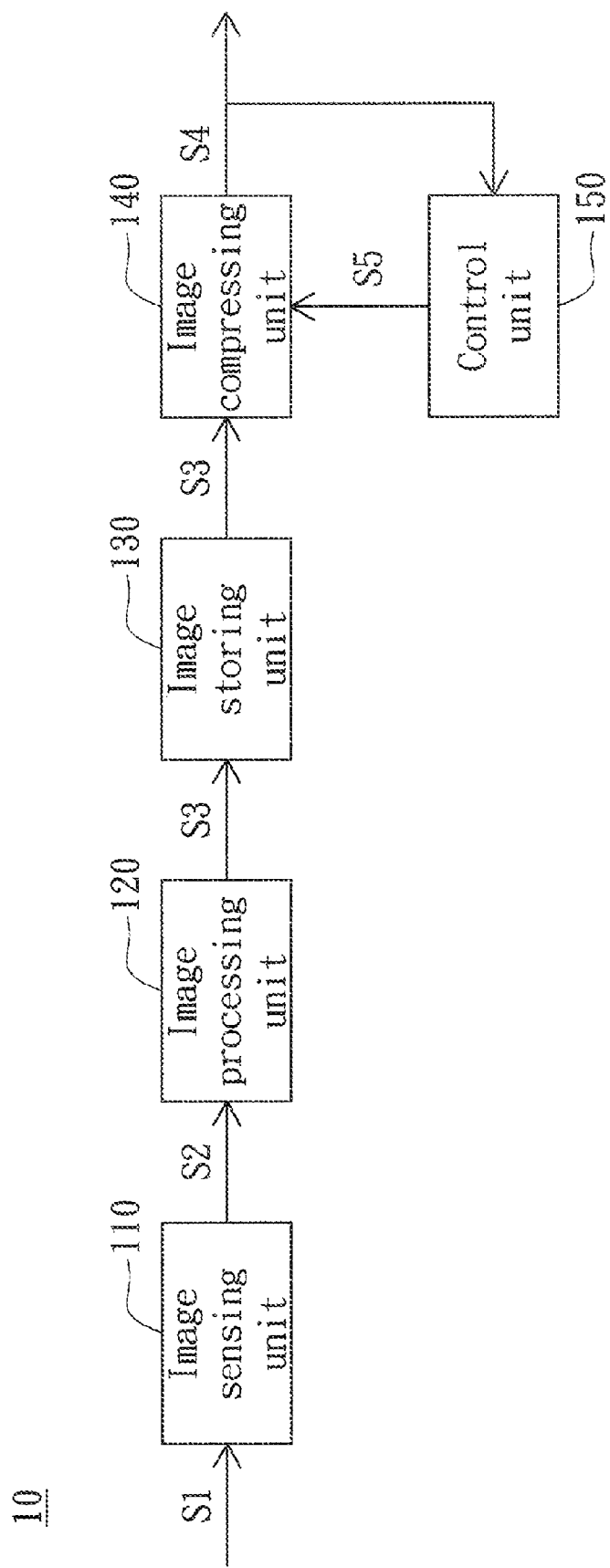
FIG. 1 (Prior Art) is a schematic illustration showing a first conventional image capturing apparatus in a capturing mode.
Figure 2:
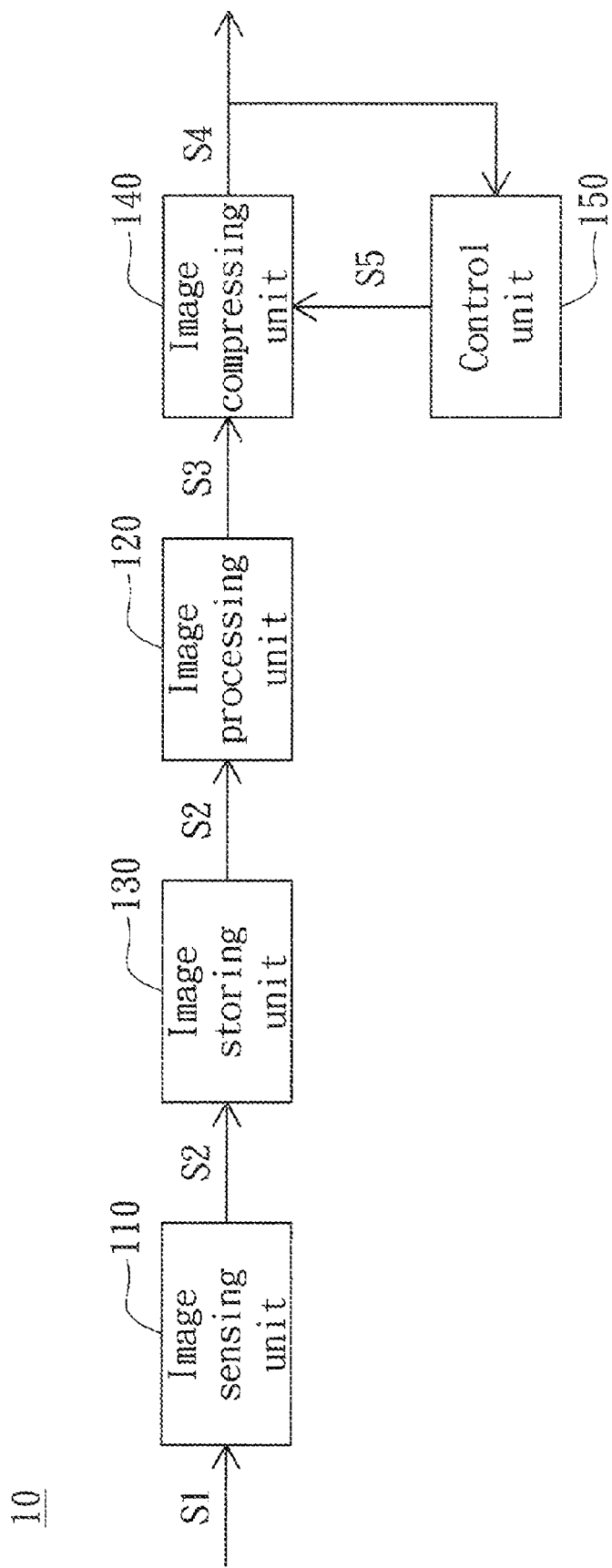
FIG. 2 (Prior Art) is a schematic illustration showing a second conventional image capturing apparatus in the capturing mode.
Figure 3:
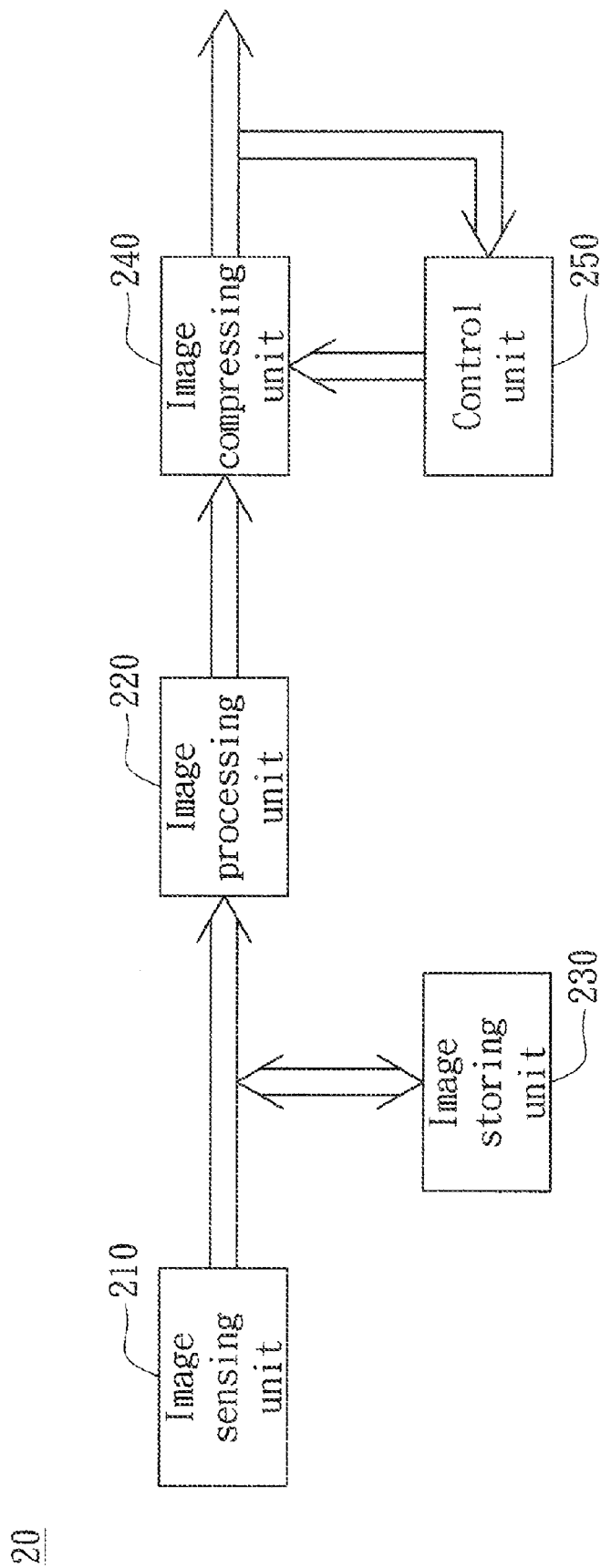
FIG. 3 is a block diagram showing an image capturing apparatus according to a preferred embodiment of the invention.

FIG. 3 is a block diagram showing an image capturing apparatus 20 according to a preferred embodiment of the invention. Referring to FIG. 3, the image capturing apparatus 20, such as a digital camera, includes an image sensing unit 210, an image processing unit 220, an image storing unit 230, an image compressing unit 240 and a control unit 250.

Figure 4:
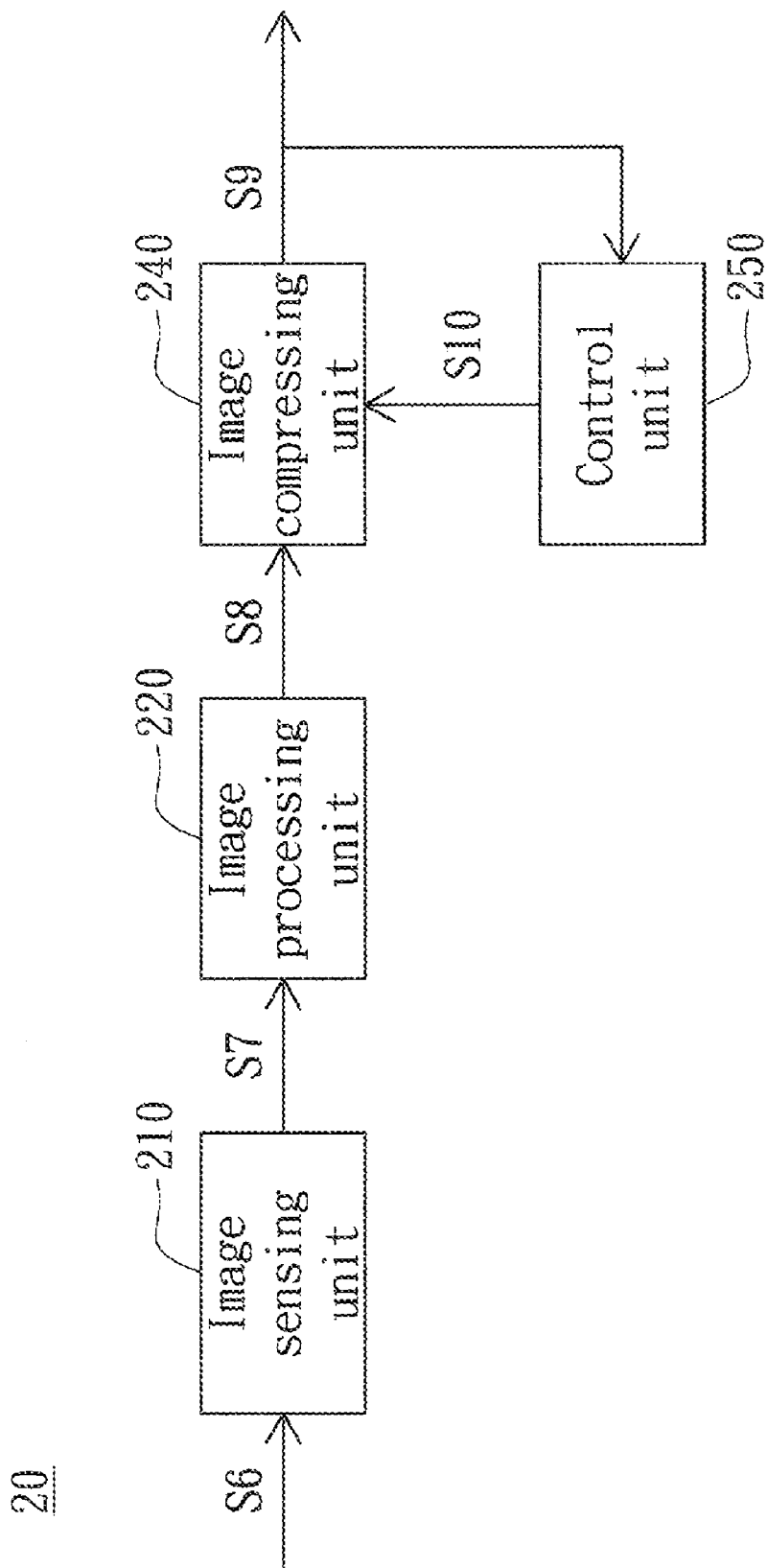
FIG. 4 is a schematic illustration showing the image capturing apparatus in a preview mode.

The image capturing apparatus 20 has two operation modes, one of which is a preview mode and the other of which is a capturing mode. Referring to FIG. 4, a schematic illustration of the image capturing apparatus in a preview mode is shown.

When the image capturing apparatus 20 is in the preview mode, the image sensing unit 210 captures a preview image S6 and outputs a preview image signal S7 according to the preview image S6. The image processing unit 220 processes the preview image signal S7 by way of, for example, demosaicking, gamma correction, color reproduction and edge enhancement, and then correspondingly output preview image data S8.

The control unit 250 controls the image compressing unit 240 to compress the preview image data S8 according to a preview quantization table S10 to generate a compressed preview image S9. In other words, the size of the compressed preview image S9 is the size of the preview image after being compressed. The control unit 250 judges an image complexity by determining the amount of high frequency components the preview image has according to a set of factors consisting of the preview quantization table S10, the resolution of the preview image S6 and the size of the compressed preview image S9. The image complexity is related to the amount of high frequency components the preview image has. The more the amount of high frequency components the preview image has, the higher the image complexity. For example, as an image IA has more high frequency components than another image IB, the image complexity of the image IA is higher than the image complexity of the image IB. Whether the preview image has more high frequency components or less can be judge according to the preview quantization table S10, the resolution of the preview image S6 and the size of the compressed preview image S9. For example, with regard to the same preview quantization table S10 and the same resolution of the preview image S6, the larger the size of the compressed preview image S9, the more high frequency components the preview image has and the higher the image complexity.

Figure 5:
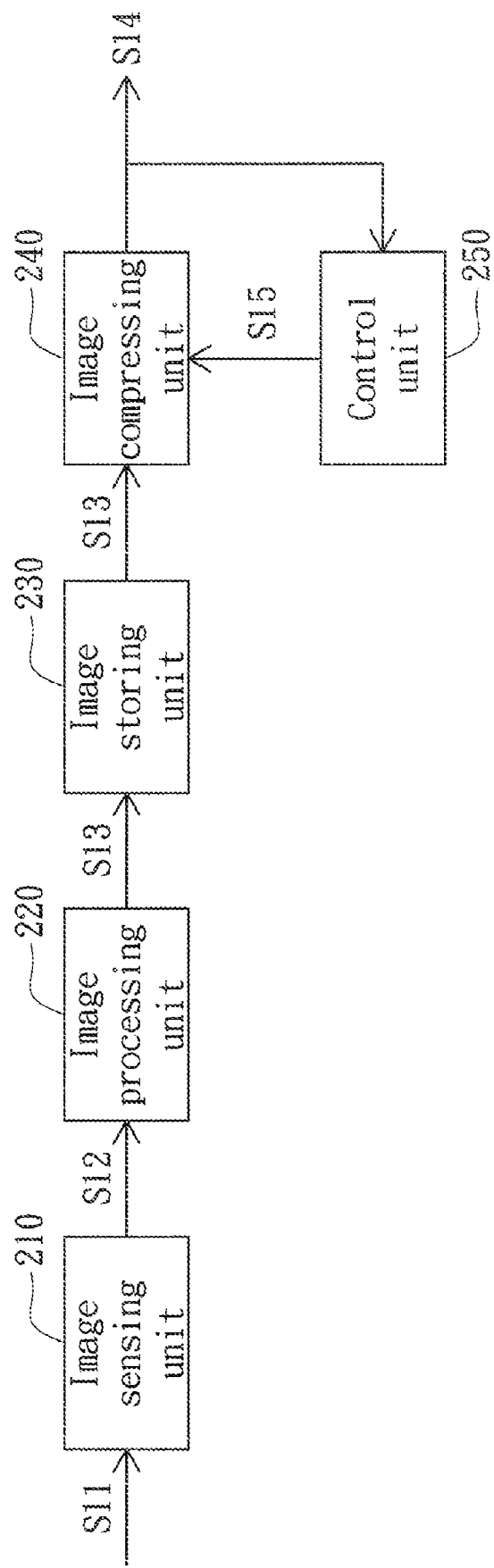
FIG. 5 is a schematic illustration showing the image capturing apparatus in a capturing mode.

FIG. 5 is a schematic illustration showing the image capturing apparatus in a capturing mode. As shown in FIG. 5, when the image capturing apparatus 20 enters the capturing mode from the preview mode, the image sensing unit 210 captures a to-be-captured image S11 and outputs a to-be-captured image signal S12 according to the to-be-captured image S11. The image processing unit 220 processes the to-be-captured image signal S12 to output to-be-captured image data S13, which is temporarily stored into the image storing unit 230 in the capturing mode.

Because the image capturing apparatus 20 has analyzed and judged the image complexity in the preview mode, the control unit 250 determines an initial quantization table S15 according to a set of factors consisting of the judged image complexity, the resolution of the to-be-captured image S11 and an image compression target. The initial quantization table S15 is a new quantization table with respect to the preview quantization table S10. The control unit 250 also controls the image compressing unit 240 to compress the to-be-captured image data S13 to obtain an output image S14 with the image compression target according to the initial quantization table S15. Furthermore, the control unit 250 checks whether the size of the output image S14 equals the image compression target. If the size of the output image S14 does not equal the image compression target, the control unit 250 controls the image compressing unit 240 to re-compress the output image S14 repeatedly to ensure the size of the output image S14 being the image compression target.

Compared with the conventional image capturing apparatus, the image capturing apparatus 20 compresses a preview image and judges the image complexity in advance in the preview mode. Thus, after entering the capturing mode, the image capturing apparatus 20 can immediately determine the initial quantization table, and accordingly compress the to-be-captured image to the output image having the image compression target. Furthermore, because of the initial quantization table S15, the image capturing apparatus 20 can perform the compression according to the initial quantization table S15, instead of the inaccurate quantization table S10, at the beginning. Thus, the predetermined image compression target can be approached rapidly and the converging speed of the image compression loop can be speeded up. Consequently, the period of working time when the image capturing apparatus 20 makes the compression in the capturing mode can be shortened.

Figure 6:
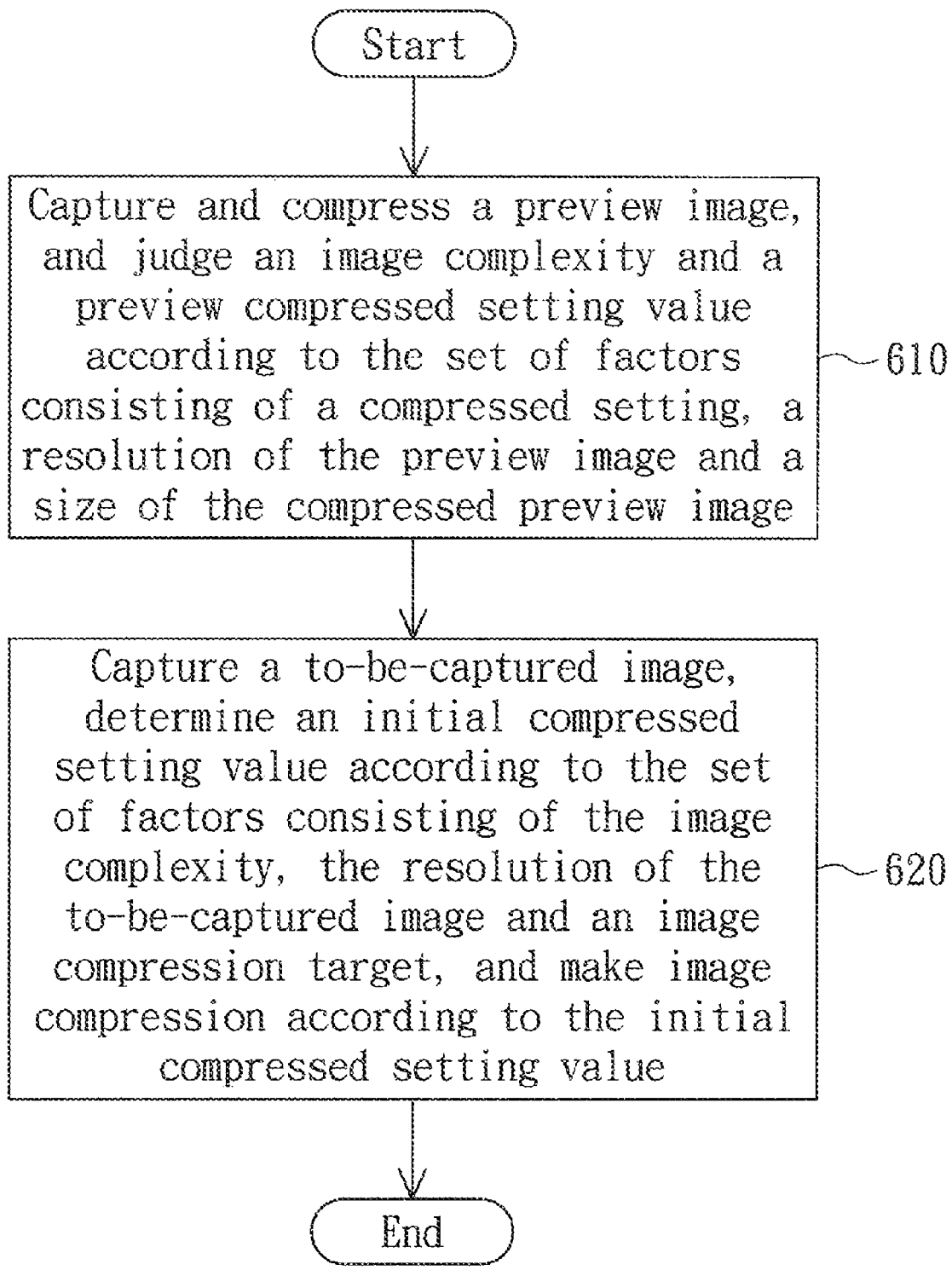
FIG. 6 is a flow chart showing an image capturing method according to the preferred embodiment of the invention.

FIG. 6 is a flow chart showing an image capturing method according to the preferred embodiment of the invention. As shown in FIG. 6, the image capturing method is used in the above-mentioned image capturing apparatus 20, and includes the following steps.

First, as shown in step 610, the image sensing unit 210 captures the preview image S6 and the image compressing unit 240 compresses the preview image data S8 when the image capturing apparatus 20 is in the preview mode. In addition, the image complexity is analyzed and judged according to the set of factors consisting of the preview quantization table S10, the resolution of the preview image S6 and the size of the compressed preview image S9. The image complexity is related to the amount of high frequency components the preview image has, and the more the amount of high frequency components the preview image has, the higher the image complexity.

Next, as shown in step 620, the image capturing apparatus 20 enters the capturing mode, and the image sensing unit 210 captures the to-be-captured image S11 and determines the initial quantization table S15 according to the set of factors consisting of the image complexity, the resolution of the to-be-captured image S11 and the image compression target. The image compressing unit 240 compresses the image according to the initial quantization table S15.

Figure 7:
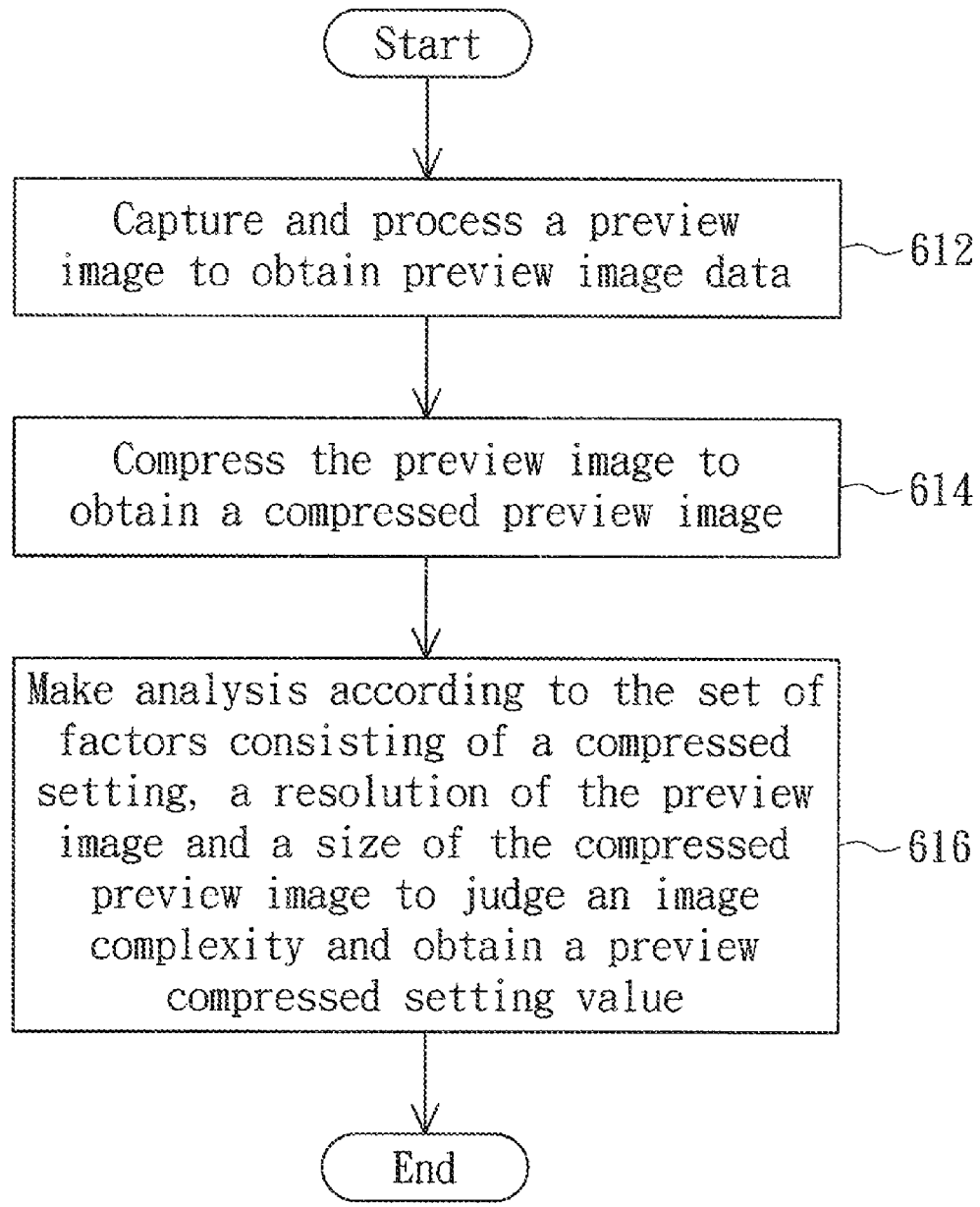
FIG. 7 is a flow chart showing details of step 610.

FIG. 7 is a flow chart showing details of step 610. The step 610 includes the following steps.

First, as shown in step 612, the image sensing unit 210 captures the preview image S6 and the image processing unit 220 processes the image to obtain the preview image data S8 when the image capturing apparatus 20 is in the preview mode.

Next, as shown in step 614, the image compressing unit 240 compresses the preview image data S8 according to the preview quantization table S10 to obtain the compressed preview image S9.

Finally, as shown in step 616, the control unit 250 judges the image complexity according to the set of factors consisting of the preview quantization table S10, the resolution of the preview image S6 and the size of the compressed preview image S9.

Figure 8:
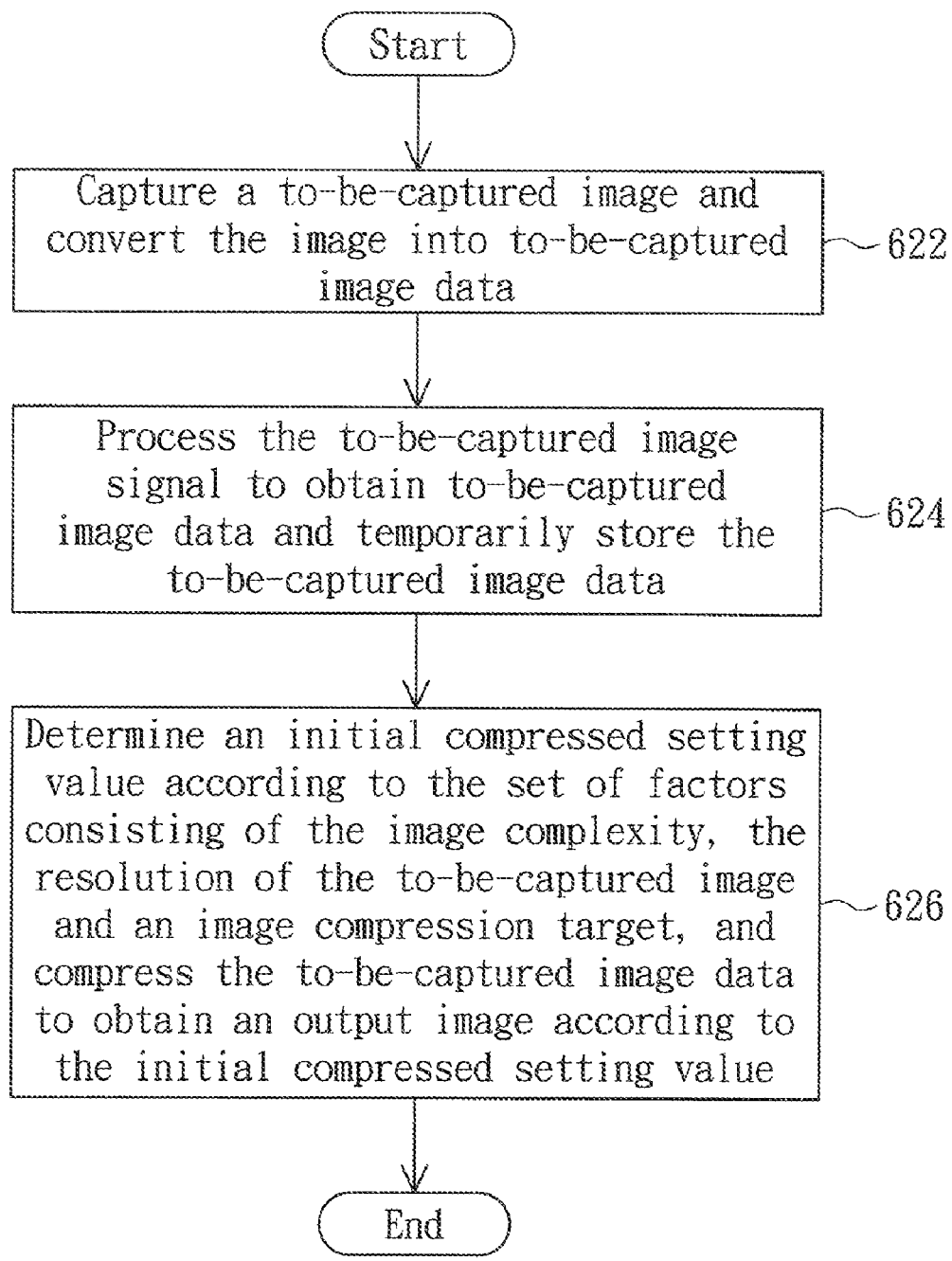
FIG. 8 is a flow chart showing details of step 620.

FIG. 8 is a flow chart showing details of step 620. Referring to FIG. 8, step 620 includes the following steps.

First, as shown in step 622, the image capturing apparatus 20 enters the capturing mode, and the image sensing unit 210 captures the to-be-captured image S11 and converts the image S11 into the to-be-captured image signal S12.

Next, as shown in step 624, the image processing unit 220 processes the to-be-captured image signal S12 to obtain the to-be-captured image data S13, which is temporarily stored in the image storing unit 230.

Finally, as shown in step 626, the control unit 250 determines the initial quantization table S15 according to the set of factors consisting of the image complexity, the resolution of the to-be-captured image signal S12 and the compressed image target size, and controls the image compressing unit 240 to compress the to-be-captured image data S13 to obtain the output image S14 according to the initial quantization table S15. Furthermore, in step 626, the control unit 250 checks whether the size of the output image S14 equals the image compression target. If the size of the output image S14 does not equal the image compression target, the control unit 250 controls the image compressing unit 240 to re-compress the output image S14 repeatedly to ensure the size of the output image S14 being the image compression target.

Figure 9:
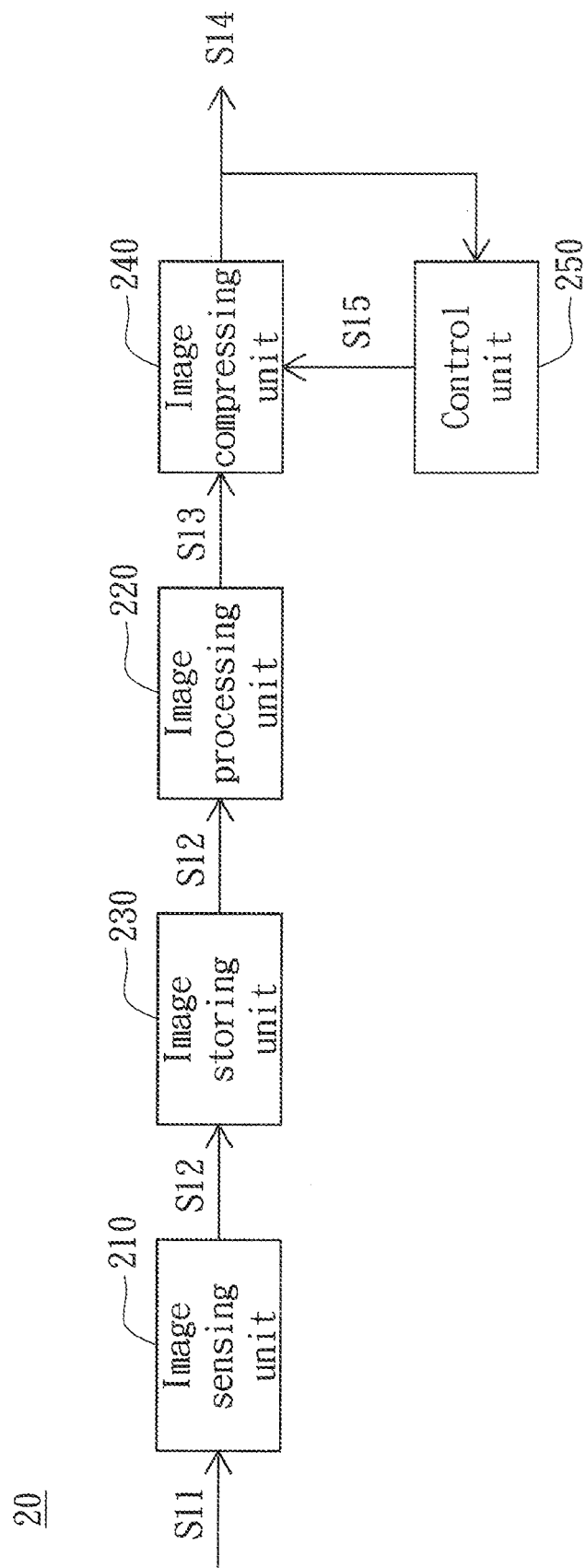
FIG. 9 is a schematic illustration showing another image capturing apparatus in a capturing mode.

FIG. 9 is a schematic illustration showing another image capturing apparatus in the capturing mode. In addition, when the image capturing apparatus 20 enters the capturing mode, the image storing unit 230 may also store the to-be-captured image signal S12 outputted from the image sensing unit 210, and then the image processing unit 220 processes the to-be-captured image signal S12. Then, the initial quantization table S15 is determined according to the set of factors consisting of the image complexity judged in the preview mode, the resolution of the to-be-captured image S11 and the compressed image target size. The image compressing unit 240 compresses the image to obtain the output image S14 according to the initial quantization table S15.

The image compressing unit 240 can calculate the image complexity in advance in the preview mode when either the to-be-captured image signal S12 or the to-be-captured image data S13 is stored in the image storing unit 230. Thus, after the image capturing apparatus 20 enters the capturing mode, the initial quantization table S15 can be rapidly determined according to the set of factors consisting of the judged image complexity, the resolution of the to-be-captured image S11 and the image compression target. Thus, the to-be-captured image data S13 can be rapidly compressed into the predetermined image compression target.

In the image capturing apparatus and the image capturing method according to the embodiments of the invention, the image capturing apparatus compresses a preview image and judges the image complexity in advance in the preview mode. Thus, after entering the capturing mode, the image capturing apparatus can immediately determine the initial quantization table, and accordingly compress the to-be-captured image to the output image having the image compression target. Furthermore, the image capturing apparatus can perform the compression according to the initial quantization table, instead of the inaccurate quantization table, at the beginning. Thus, the predetermined image compression target can be approached rapidly and the converging speed of the image compression loop can be speeded up. Consequently, the period of working time when the image capturing apparatus makes the compression in the capturing mode can be shortened.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image capturing method, comprising the steps of:
   (a) capturing a preview image;
   (b) compressing the preview image into a compressed preview image according to a preview quantization table;
   (c) judging an image complexity by determining the amount of high frequency components the preview image has according to a set of factors consisting of the preview quantization table, a resolution of the preview image and a size of the compressed preview image, wherein the more the amount of high frequency components the preview image has, the higher the image complexity;
   (d) capturing a to-be-captured image;
   (e) determining an initial quantization table according to a set of factors consisting of the image complexity, a resolution of the to-be-captured image and an image compression target; and
   (f) compressing the to-be-captured image into an output image according to the initial quantization table.

2. The method according to claim 1, further comprising:
   (g) checking whether a size of the output image equals the image compression target; and
   (h) compressing the output image if the size of the output image does not equal the image compression target.

3. The method according to claim 1, wherein step (b) comprises:
   (b-1) processing the preview image to obtain preview image data; and
   (b-2) compressing the preview image data to obtain the compressed preview image according to the preview quantization table.

4. The method according to claim 1, wherein step (e) comprises:
   (e-1) processing the to-be-captured image to obtain to-be-captured image data; and
   (e-2) determining the initial quantization table according to the set of factors consisting of the image complexity, the resolution of the to-be-captured image and the image compression target.

5. The method according to claim 4, wherein step (e-1) comprises:
   (e-1-1) converting the to-be-captured image into a plurality of to-be-captured image signals, which are temporarily stored; and (e-1-2) processing the temporarily stored to-be-captured image signals to obtain the to-be-captured image data.

6. The method according to claim 4, wherein step (e-1) comprises:
(e-1-1') converting the to-be-captured image into a to-be-captured image signal; and
(e-1-2') processing the to-be-captured image signal to obtain the to-be-captured image data, and temporarily storing the to-be-captured image data.

7. An image capturing apparatus, comprising:
an image sensing unit for capturing a preview image and a to-be-captured image, and outputting a preview image signal and a to-be-captured image signal;
an image processing unit for processing the preview image signal and the to-be-captured image signal and outputting preview image data and to-be-captured image data;
an image compressing unit for compressing the preview image data and the to-be-captured image data; and
a control unit for controlling an image compressing operation of the image compressing unit, wherein:
the control unit controls the image compressing unit to compress the preview image data according to a preview quantization table and output a compressed preview image, and judges an image complexity by determining the amount of high frequency components the preview image has according to a set of factors consisting of the preview quantization table, a resolution of the preview image and a size of the compressed preview image, wherein the more the amount of high frequency components the preview image has, the higher the image complexity;
the control unit determines an initial quantization table according to a set of factors consisting of the image complexity, a resolution of the to-be-captured image and an image compression target; and
the control unit controls the image compressing unit to compress the to-be-captured image data into an output image according to the initial quantization table.

8. The apparatus according to claim 7, wherein the control unit checks whether a size of the output image equals the image compression target, and if not, the control unit controls the image compressing unit to compress the output image.

9. The apparatus according to claim 7, further comprising an image storing unit for storing the to-be-captured image signal.

* * * * *